United States Patent
Izumi

(10) Patent No.: US 7,024,164 B2
(45) Date of Patent: Apr. 4, 2006

(54) RADIO COMMUNICATION APPARATUS

(75) Inventor: Shinobu Izumi, Saitama (JP)

(73) Assignee: Sony Corporation, Tokyo (JP)

( * ) Notice: Subject to any disclaimer, the term of this patent is extended or adjusted under 35 U.S.C. 154(b) by 787 days.

(21) Appl. No.: 09/932,906

(22) Filed: Aug. 20, 2001

(65) Prior Publication Data

US 2002/0022456 A1    Feb. 21, 2002

(30) Foreign Application Priority Data

Aug. 21, 2000   (JP) ............................. 2000-250373

(51) Int. Cl.
*H04M 11/00*    (2006.01)

(52) U.S. Cl. ................... 455/74.1; 455/3.06; 455/66.1; 455/151.2; 455/153.2; 348/14.02

(58) Field of Classification Search ................ 364/514; 348/13; 455/4, 419, 420
See application file for complete search history.

(56) References Cited

U.S. PATENT DOCUMENTS

| | | | |
|---|---|---|---|
| 5,101,499 A * | 3/1992 | Streck et al. ................ | 725/81 |
| 5,410,326 A | 4/1995 | Goldstein | |
| 5,410,343 A | 4/1995 | Coddington et al. | |
| 5,467,341 A | 11/1995 | Matsukane et al. | |
| 5,550,754 A * | 8/1996 | McNelley et al. ....... | 348/14.01 |
| 5,802,467 A * | 9/1998 | Salazar et al. .............. | 455/420 |
| 5,862,339 A | 1/1999 | Bonnaure et al. | |
| 5,896,131 A | 4/1999 | Alexander | |
| 5,917,810 A | 6/1999 | De Bot | |
| 5,920,701 A | 7/1999 | Miller et al. | |
| 5,933,141 A | 8/1999 | Smith | |
| 5,949,432 A | 9/1999 | Gough et al. | |
| 6,012,088 A | 1/2000 | Li et al. | |
| 6,028,600 A | 2/2000 | Rosin et al. | |
| 6,037,998 A | 3/2000 | Usui et al. | |
| 6,097,441 A | 8/2000 | Allport | |
| 6,249,690 B1 * | 6/2001 | Mashiko ..................... | 455/573 |
| 6,263,503 B1 | 7/2001 | Margulis | |

(Continued)

FOREIGN PATENT DOCUMENTS

CN    1249644    4/2000

(Continued)

OTHER PUBLICATIONS

Patent Abstracts of Japan, 2001-177478 dated Jun. 29, 2001.

(Continued)

*Primary Examiner*—Fan Tsang
*Assistant Examiner*—Lisa Hashem
(74) *Attorney, Agent, or Firm*—Frommer Lawrence & Haug LLP; William S. Frommer; Thomas F. Presson

(57) ABSTRACT

A communication apparatus having a transmission section and a reception section that are selectively attached or detached from one another. The transmission section is operable to modulate an information signal to generate a high frequency signal and to wirelessly transmit the high frequency signal to the reception section, or to output the information signal to the reception section via a non-wireless coupling. The reception section is operable to receive the high frequency signal transmitted from the transmission section and to demodulate the high frequency signal to recover the information signal, or to receive the information signal outputted from the transmission section. Further, an attached condition is sensed, indicating whether the transmission section and the reception section are connected/attached to each other or disconnected/detached from each other, and switching between wireless transmission and non-wireless transmission is performed in accordance with the indicated condition.

8 Claims, 3 Drawing Sheets

U.S. PATENT DOCUMENTS

| | | | |
|---|---|---|---|
| 6,396,523 B1 | 5/2002 | Segal et al. | |
| 6,417,869 B1 | 7/2002 | Do | |
| 6,469,633 B1 | 10/2002 | Wachter | |
| 6,670,970 B1 | 12/2003 | Bonura et al. | |

FOREIGN PATENT DOCUMENTS

| | | | |
|---|---|---|---|
| DE | 196 28 540 | | 1/1998 |
| DE | 200 00 450 | | 3/2000 |
| EP | 0 477 754 | | 4/1992 |
| EP | 0 537 814 | | 4/1993 |
| EP | 0 617 556 | | 9/1994 |
| EP | 0 793 170 | | 9/1997 |
| EP | 0 838 945 | | 4/1998 |
| EP | 0 848 560 | | 6/1998 |
| EP | 0 942 572 | | 9/1999 |
| EP | 0 967 797 | | 12/1999 |
| EP | 1 001 627 | | 5/2000 |
| EP | 1 011 257 | | 6/2000 |
| EP | 1083744 | A2 * | 3/2001 |
| GB | 2 343 334 | | 5/2000 |
| WO | WO 95 34168 | | 12/1995 |
| WO | WO 98 59282 | | 12/1998 |
| WO | WO 99 34599 | | 7/1999 |
| WO | WO 00 14919 | | 3/2000 |
| WO | WO 01 35551 | | 5/2001 |
| WO | WO 01 35585 | | 5/2001 |

OTHER PUBLICATIONS

Vazquez-Cortizo D et al: "FS-aloha, a collision resolution algorithm with Qos support for the contention channel in multiservices wireless Lan" Global Telecommunications Conference (Globecom 99), vol. 5, Dec. 5, 1999, pp. 2773-2777, XP010373453.

"Wireless Medium Access Control (MAC) and Physical (PHY) Specifications" IEEE Standard 802.11-1997, XX, XX, 1997, pp. 71-99, XP002927753.

Gang Wu et al: "WINMAC: a novel transmission protocol for infostations" Vehicular Technology Conference, 1999 IEEE 49th Houston, TX, USA May 16-20, 1999, Piscataway, NJ, USA, IEEE, US, May 16, 1999, pp. 1340-1344, XP010342188, ISBN: 0-7803-5565-2.

Truman T et al: "The Infopad Multimedia Terminal: A Portable Device for Wireless Information Access" IEEE Transactions on Computers, IEEE Inc. New York, US, vol. 47, No. 10, Oct. 1, 1998, pp. 1073-1087, XP000781992.

Patent Abstracts of Japan vol. 1998, No. 14, Dec. 31, 1998 & JP 10 257401 A (Access:KK) Sep. 25, 1998.

* cited by examiner

RADIO COMMUNICATION APPARATUS

BACKGROUND OF THE INVENTION

The present invention relates to a radio communication apparatus which includes a transmission section for transmitting an information signal and a reception section for receiving the information signal transmitted from the transmission section.

SUMMARY OF THE INVENTION

It has been recognized that a conventional radio communication apparatus is not designed so that a transmission section and a reception section are used as a unitary member, but is configured in such a manner as shown in FIG. 1 wherein a radio AV transmitter 102 and a radio AV receiver 110 are formed separately from each other. The radio AV transmitter 102 is formed in order that an audio-video signal (hereinafter referred to as AV signal) reproduced by a video cassette recorder VCR 101 for domestic use may be outputted to a television set 116 for domestic use located at a place spaced away from the VCR 101 for domestic use. In the following, the conventional radio communication apparatus is described with reference to FIG. 1.

The VCR 101 for domestic use plays back information recorded on an information recording medium and outputs the played back information as an AV signal to an AV signal processing section 103 in the radio AV transmitter 102.

The AV signal processing section 103 is composed of a buffer amplifier, a filter and other elements and converts an AV signal outputted from the VCR 101 for domestic use into a signal of an amplitude value optimum for modulation. The AV signal processing section 103 outputs the AV signal obtained by the conversion to a modulation section 104.

The modulation section 104 modulates the AV signal inputted thereto from the AV signal processing section 103 with a carrier of an IF (intermediate frequency) frequency inputted thereto from a frequency synthesizer 105 which can produce a particular frequency, and outputs the signal obtained by the modulation as an IF signal to a frequency conversion section 106.

The frequency conversion section 106 mixes the IF signal inputted thereto from the modulation section 104 and a local oscillation frequency inputted thereto from the frequency synthesizer 105 to obtain a high frequency signal, that is, a radio frequency (RF) signal and outputs the RF frequency signal to a power amplifier 107.

The power amplifier 107 amplifies the RF signal inputted thereto from the frequency conversion section 106 to a signal of a prescribed power and outputs the amplified RF signal to a transmission antenna 108.

The transmission antenna 108 radiates the RF signal inputted thereto from the power amplifier 107 as radio waves into the space.

Then, a reception antenna 109 connected to the radio AV receiver 110 outputs the radio waves outputted from the transmission antenna 108 as an RF signal to a low noise amplifier 111.

The low noise amplifier 111 amplifies the RF signal inputted thereto from the reception antenna 109 and outputs the amplified RF signal to a frequency conversion section 112.

The frequency conversion section 112 mixes a local oscillation frequency inputted from a frequency synthesizer 113 with the RF signal inputted thereto from the low noise amplifier 111 to obtain an IF signal and outputs the IF signal to a demodulation section 114.

The demodulation section 114 demodulates the IF signal inputted thereto from the frequency conversion section 112 with a carrier of an IF frequency inputted thereto from the frequency synthesizer 113 to obtain an AV signal and outputs the AV signal to an AV signal processing section 115.

The AV signal processing section 115 removes noise from the AV signal inputted thereto from the demodulation section 114 and amplifies and outputs the signal free from noise to the television set 116 for domestic use.

The television set 116 for domestic use reproduces the AV signal inputted thereto from the AV signal processing section 115 to obtain an image and/or sound.

In the conventional radio communication apparatus having the configuration described above, an AV signal outputted from the VCR 101 for domestic use is converted into an RF signal and the RF signal is transmitted by radio transmission, and then an image and/or sound are reproduced from the RF signal by the television set 116 for domestic use.

The conventional radio communication apparatus described above is susceptible to radio interference. For example, when an electric apparatus such as a microwave oven which generates radio waves is located in the proximity of the radio communication apparatus, the waves generated by the electric apparatus may be erroneously received by the communication apparatus, thereby degrading performance of the communication apparatus. Such interference can occur even when the transmission antenna and the reception antenna are positioned near to each other. The level of the interfering radio waves is sometimes so high that the image and/or sound reproduced by the radio communication apparatus is unintelligible.

In the system of FIG. 1, to obtain a good image and/or sound in the presence of interference, it is necessary to move the television set 116 to a place near to the VCR 101, or conversely, to move the VCR 101 to a place near to the television set 116, remove the radio AV transmitter 102 and the radio AV receiver 110; and connect the television set 116 and the VCR 101 directly to each other by an AV cable or the like. In this manner, the image information and/or sound information is communicated between the television set 116 and the VCR 101 via the cable, which is less susceptible to interference than a wireless link.

The present invention overcomes drawbacks of conventional radio communication systems.

The invention includes a transmission section and a reception section that are selectively attached or detached from one another. The transmission section is operable to modulate an information signal to generate a high frequency signal and to wirelessly transmit the high frequency signal to the reception section, or to output the information signal to the reception section via a non-wireless coupling. The reception section is operable to receive the high frequency signal transmitted from the transmission section and to demodulate the high frequency signal to recover the information signal, or to receive the information signal outputted from the transmission section. Further, an attached condition is sensed, indicating whether the transmission section and the reception section are connected/attached to each other or disconnected/detached from each other, and switching between wireless transmission and non-wireless transmission is performed in accordance with the indicated condition.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE PREFERRED EMBODIMENT

Figure 2:
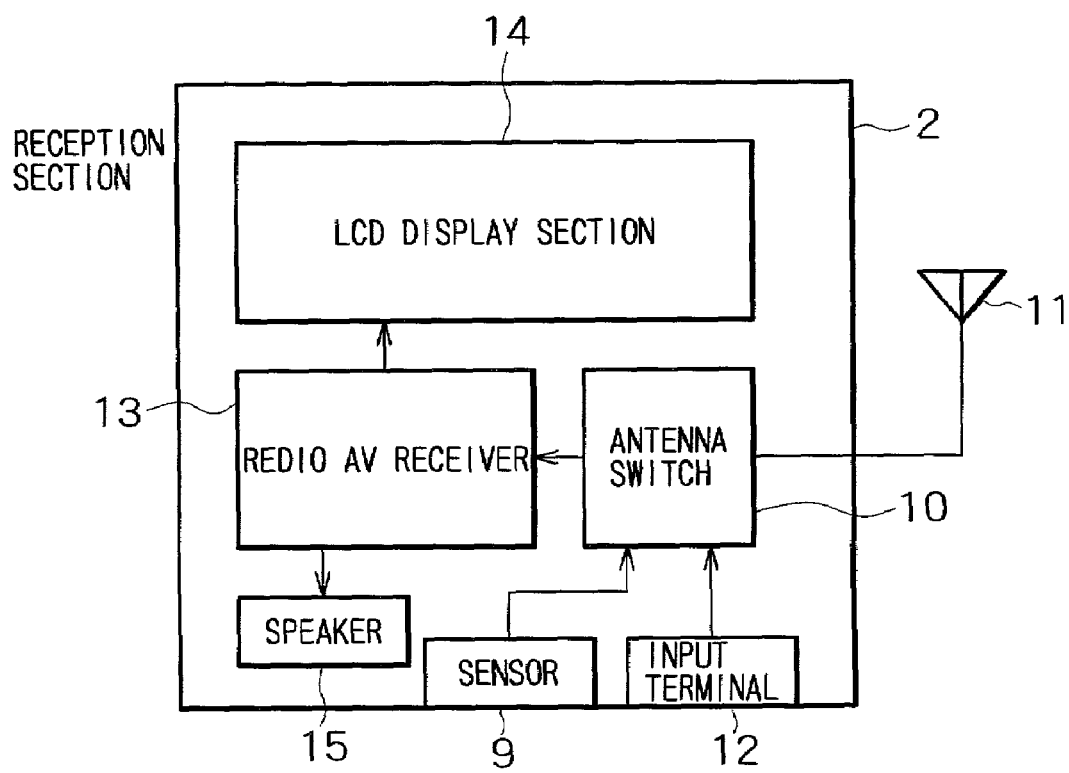
FIG. 2 is a block diagram showing a configuration of an illustrative radio communication apparatus to which the present invention is applied.
Figure 2:
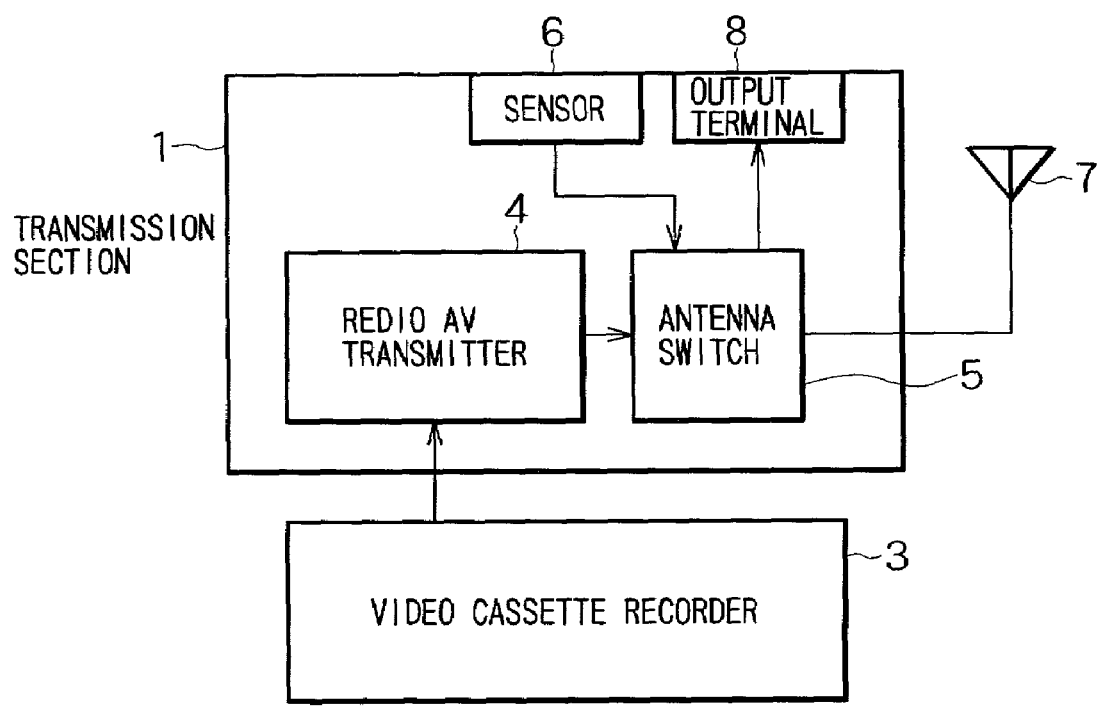

Referring to FIG. 2, there is shown an illustrative radio communication apparatus to which the present invention is applied. In the apparatus of FIG. 2 an AV signal outputted from a VCR 3 is displayed on a liquid crystal display (LCD) 14.

The radio communication apparatus includes a transmission section 1 for transmitting an information signal which is a signal of image information and/or sound information, and a reception section 2 for receiving the information signal.

The transmission section 1 and the reception section 2 of the radio communication apparatus can be operated in a detached configuration, wherein communication between the sections is through a wireless link. Or, the transmission section and reception section can be operated as a unitary apparatus, wherein the sections are in physical contact with each other ("attached") and communication is carried out through a non-wireless link.

The transmission section 1 includes an apparatus which outputs an information signal as an AV signal such as, for example, a VCR 3 which outputs an AV signal. The transmission section 1 can convert the AV signal into a high frequency signal, that is, an RF signal and transmit the RF signal to the reception section 2 by radio transmission or by wire transmission.

The VCR 3 can record and play back an information signal onto and from a video cassette tape which is a kind of information recording medium and can output a played back information signal as an AV signal.

The transmission section 1 includes a radio AV transmitter 4 for converting an AV signal inputted thereto from the VCR 3 into an RF signal and outputting the RF signal, an antenna switch 5 serving as a selection means, a sensor 6 serving as a detection means for detecting a connection/attached condition between the transmission section 1 and the reception section 2, a transmission antenna 7 for outputting the RF signal by radio transmission, and an output terminal 8 adapted to be connected/attached to the reception section 2 for outputting the RF signal by non-wireless (e.g. wire) transmission.

Figure 1:
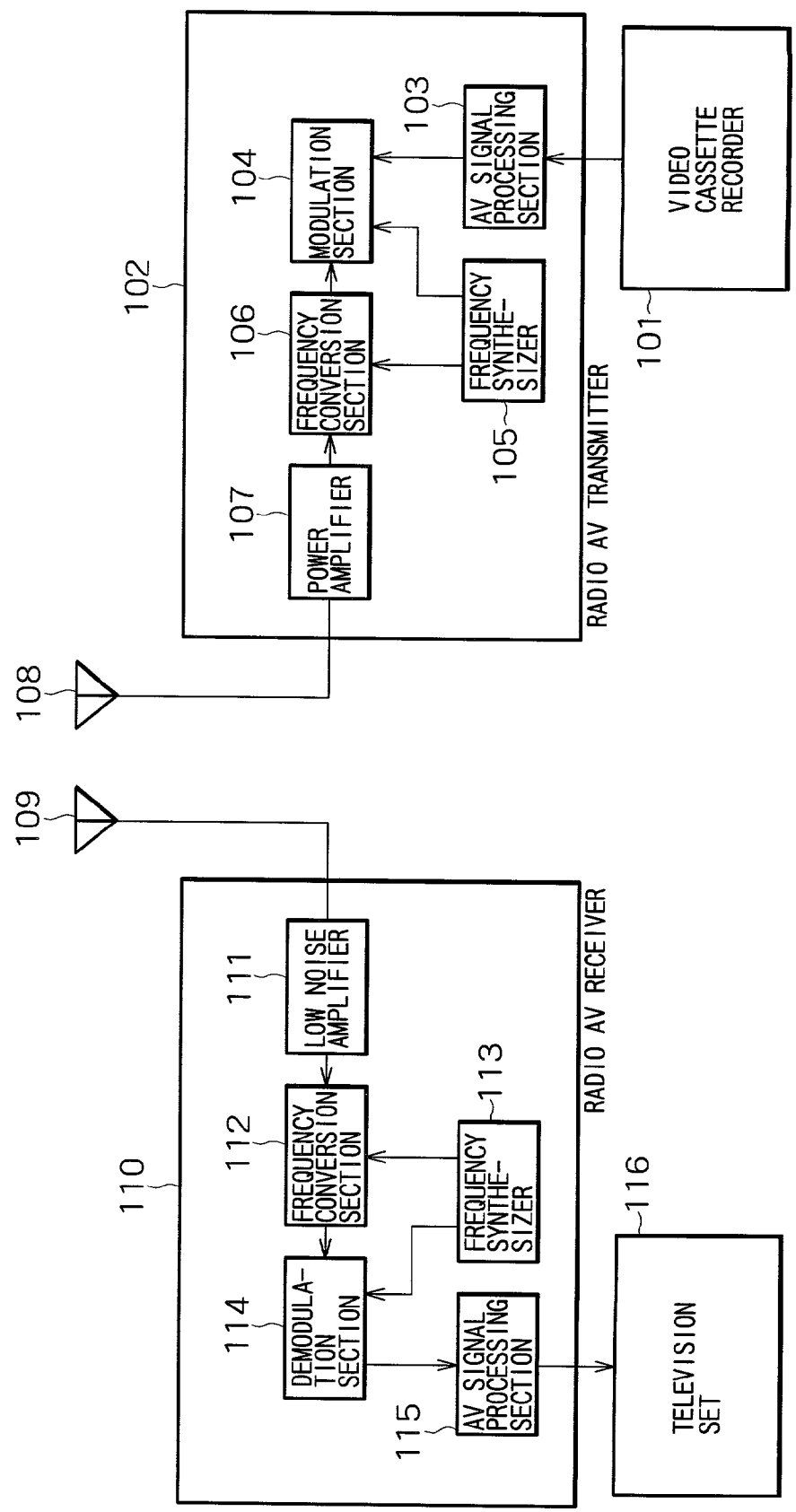
FIG. 1 is a block diagram showing a conventional radio communication apparatus.

The radio AV transmitter 4 is connected to the VCR 3 and the antenna switch 5, and converts an AV signal inputted thereto from the VCR 3 into an RF signal and outputs the RF signal to the antenna switch 5. The radio AV transmitter 4 is substantially similar to the radio AV transmitter 102 described hereinabove with reference to FIG. 1, and therefore overlapping description of an internal configuration and operation of the radio AV transmitter 4 is omitted to avoid redundancy.

The sensor 6 is connected to the antenna switch 5, and detects a connection condition between the transmission section 1 and the reception section 2, for example, when the reception section 2 is located at a predetermined position at an upper portion of the transmission section 1, and sends connection information to the antenna switch 5.

The antenna switch 5 is connected to the transmission antenna 7 and the output terminal 8 and receives the connection information from the sensor 6. Based on the connection information, the antenna switch 5 switches between the outputting methods of radio transmission and wire transmission. Further, if the connection information indicates that the transmission section 1 and the reception section 2 are not connected to each other ("detached" from each other), the antenna switch 5 changes over the circuit to the transmission antenna 7 side in order that the inputted RF signal may be outputted by radio transmission. Then, the antenna switch 5 outputs an RF signal sent thereto from the radio AV transmitter 4 to the transmission antenna 7 so that the RF signal is radiated as radio waves from the transmission antenna 7.

On the other hand, if the antenna switch 5 receives from the sensor 6 connection information indicating that the transmission section 1 and the reception section 2 are connected to each other, it changes over the circuit to the output terminal 8 side so that the inputted RF signal may be transmitted by non-wireless (e.g. wire) transmission. Then, the antenna switch 5 outputs an RF signal sent thereto from the radio AV transmitter 4 to the output terminal 8 so that the RF signal is transmitted from the output terminal 8 to the reception section 2.

The transmission antenna 7 is provided, for example, external to the transmission section 1 and outputs an RF signal inputted thereto from the antenna switch 5 as radio waves into the space.

Further, the transmission section 1 is connected, for example, to a power supply (not shown) for energizing the entire transmission section 1. For the power supply, a commercial power supply of a voltage of 100 V, 110 V, 200 V or 220 V or the like may be used.

The reception section 2 includes a sensor 9 serving as a detection means for detecting that the transmission section 1 and the reception section 2 are connected/attached to each other, an antenna switch 10 serving as a selection means, a reception antenna 11 for receiving an RF signal transmitted by radio waves from the transmission antenna 7, and an input terminal 12 adapted to be connected to the output terminal 8 for allowing non-wireless (e.g. wire) transmission.

The sensor 9 is connected to the antenna switch 10, and similar to the sensor 6, detects a connection condition between the transmission section 1 and the reception section 2 when the reception section 2 is located, for example, at a predetermined position of the upper portion of the transmission section 1. The sensor 9 sends connection information indicative of the connection condition to the antenna switch 10.

The antenna switch 10 is connected to the reception antenna 11 and the input terminal 12, and changes over the circuit to the reception antenna 11 or the input terminal 12 in response to the connection information from the sensor 9.

When the transmission section 1 and the reception section 2 are not connected to each other, the antenna switch 10 changes over the circuit to the reception antenna 11 in response to the connection information from the sensor 9 so that an RF signal transmitted by radio waves from the transmission antenna 7 is received.

On the other hand, when the transmission section 1 and the reception section 2 are connected to each other, the antenna switch 10 changes over the circuit to the input terminal 12 in response to the connection information from the sensor 9 so that an RF signal transmitted via output terminal 8 is received.

When the transmission section 1 and the reception section 2 are connected to each other, the output terminal 8 and the input terminal 12 may be moved into a connected state, for example, by biasing forces of respective spring elements, or may be projected into a connected state in response to the connection information sent from the sensors 6 and 9. In the latter case, the sensors 6 and 9 and the output terminal 8 and input terminal 12 are connected to each other, respectively, and the output terminal 8 and the input terminal 12 require projection elements for individually projecting them.

The reception section 2 further includes a radio AV receiver 13 for converting an RF signal into an AV signal. The radio AV receiver 13 is connected to the antenna switch 10 such that the antenna switch 10 sends an RF signal inputted from the reception antenna 11 or the input terminal 12 to the radio AV receiver 13. It is to be noted that the radio AV receiver 13 is substantially similar to the radio AV receiver 110 described hereinabove with reference to FIG. 1, and therefore overlapping description of an internal configuration and operation of the radio AV receiver 13 is omitted to avoid redundancy.

The reception section 2 further includes, for example, an LCD display section 14 which can reproduce image information and a speaker 15 which can reproduce sound information.

The radio AV receiver 13 is connected to the LCD display section 14 and the speaker 15, and converts an RF signal inputted thereto from the antenna switch 10 into an AV signal and outputs the AV signal to the LCD display section 14 and the speaker 15. It is to be noted that the signal to be outputted to the LCD display section 14 is an analog composite signal, which is an image signal included in the AV signal, and the signal to be outputted to the speaker 15 is an audio signal.

Thus, in the reception section 2, an information signal, originally played back by the VCR 3, is reproduced by the LCD display section 14 and/or the speaker 15.

Further, the reception section 2 has an internal power supply (not shown), which may be, for example, a re-chargeable secondary battery. The secondary battery can receive supply of power from the transmission section 1 and be charged thereby while the transmission section 1 and the reception section 2 are connected to each other.

When the sensor 9 detects that the transmission section 1 and the reception section 2 are connected to each other, the reception section 2 does not use the internal power supply but receives supply of power for the components thereof, such as the LCD display section 14, from the transmission section 1 to allow the components to operate. It is to be noted that also the reception section 2 may be configured such that it can be connected to an external commercial power supply of 100 V, 110 V, 200 V or 220 V or the like.

When the sensor 9 detects that the transmission section 1 and the reception section 2 are not connected, the secondary battery is used to power the components of the reception section 2.

Figure 3:
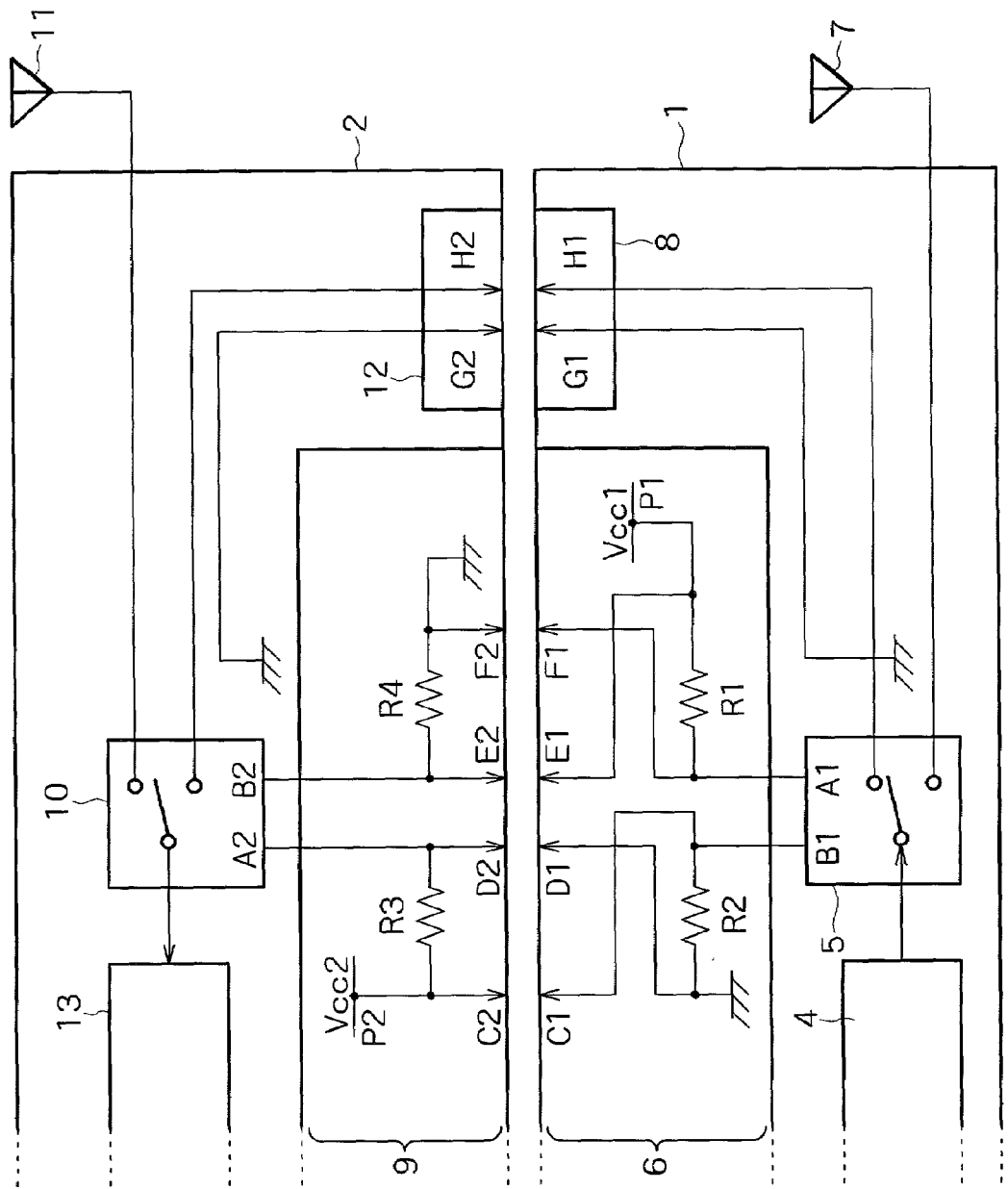
FIG. 3 is a circuit diagram showing a detailed configuration of the radio communication apparatus of FIG. 2.

FIG. 3 is a circuit diagram showing a detailed configuration of the radio communication apparatus of FIG. 2. FIG. 3 shows a preferred configuration for implementing switching between radio communication and wire communication of an information signal in response to the existing connection condition between the transmission section 1 and the reception section 2.

The sensor 6 in the transmission section 1 is formed from, for example, an electric circuit and detects the connection condition between the transmission section 1 and the reception section 2 from flow of current through the electric circuit. The sensor 6 includes four terminals C1, D1, E1 and F1.

The sensor 9 in the reception section 2 detects a connection condition between the transmission section 1 and the reception section 2 in the same fashion as sensor 6. The sensor 9 includes four terminals C2, D2, E2 and F2.

If the reception section 2 is placed at the predetermined position at the upper portion of the transmission section 1, then the terminals C1 and C2, D1 and D2, E1 and E2, and F1 and F2 are respectively connected to each other, and the voltage applied in the electric circuit of each of the sensors 6 and 9 changes. The sensors 6 and 9 interpret such changes in current and voltage as connection information and respectively forward the information to the antenna switches 5 and 10. In response to the connection information, the antenna switches 5 and 10 change over the communication method to radio communication or to wire communication.

Here, the voltages to be applied in the electric circuits of the sensors 6 and 9 when the transmission section 1 and the reception section 2 are not connected to each other are described.

A voltage Vcc1 is applied to a point P1 in the transmission section 1, and a voltage Vcc2 is applied to a point P2 in the reception section 2.

The terminals C1, D1, E1 and F1 on the transmission section 1 side are not connected to the terminals C2, D2, E2 and F2 on the reception section 2 side. Thus, the voltage Vcc1 applied to the point P1 is applied to a resistor R1, and a voltage equal to Vcc1 minus the voltage drop across resistor R1 is applied to a terminal A1 of the antenna switch 5. Meanwhile, the voltage Vcc2 applied to the point P2 is applied to a resistor R3, and a voltage equal to Vcc2 minus the voltage drop across resistor R3 is applied to a terminal A2 of the antenna switch 10.

In short, when the sensors 6 and 9 do not detect that the transmission section 1 and the reception section 2 are connected/attached to each other, predetermined voltages are applied to the terminals A1 and A2 of the antenna switches 5 and 10. The voltages are used as connection information, and the antenna switch 5 and the antenna switch 10 change over the circuits to the transmission antenna 7 and the reception antenna 11, respectively, in response to the connection information.

Next, the voltages applied in the electric circuits of the sensors 6 and 9 when the transmission section 1 and the reception section 2 are connected to each other are described.

In this instance, the terminals C1, D1, E1 and F1 on the transmission section 1 side are respectively connected to the terminals C2, D2, E2 and F2 on the reception section 2 side. Thus, the voltage Vcc1 applied to the point P1 is applied through the terminals E1 and E2 connected to each other to a terminal B2 of the antenna switch 10 in the reception section 2. Meanwhile, the voltage Vcc2 applied to the point P2 is applied through the terminals C1 and C2 connected to each other to a terminal B1 of the antenna switch 5 in the transmission section 1.

In short, the sensors 6 and 9 detect that the transmission section 1 and the reception section 2 are connected to each other when the voltage Vcc1 is applied to the terminal B2 of the antenna switch 10 and the voltage Vcc2 is applied to the terminal B1 of the antenna switch 5. The voltages Vcc1 and Vcc2 are used as connection information, and the antenna switch 5 and the antenna switch 10 change over the circuits to the output terminal 8 and the input terminal 12, respectively, in response to the connection information.

It should be noted that antenna switches 5 and 10 of FIG. 3 are static switches. They are not powered, and therefore they each require two terminals for control. For example, with respect to antenna switch 5, when terminal A1 is high (pull-up), terminal B1 is low (pull-down), and the switch changes over to the transmission antenna 7. When terminal A1 is low (pull-down), terminal B1 is high (pull-up), and the switch changes over to the output terminal 8.

The invention is not limited to employing static switches. Upon study of the description provided herein, one of ordinary skill in the art will recognize many switch types that may be employed.

In any event, the output terminal 8 is formed from the terminals H1 and G1, and the input terminal 12 is formed from the terminals H2 and G2.

When the transmission section 1 and the reception section 2 are connected to each other, the sensors 6 and 9 detect the connection, and the antenna switches 5 and 10 are changed over to the output terminal 8 and the input terminal 12, respectively. Then, an RF signal is transmitted through the terminals H1 and H2. At this time, the terminals G1 and G2 are grounded to shield the RF signal transmitted through the terminals H1 and H2 and to connect the grounds of the transmission section 1 and the reception section 2 to each other.

By such operations as described above, the radio communication apparatus of the present embodiment can convert an AV signal outputted from the VCR 3 into an RF signal, switch between radio transmission and non-wireless transmission of communications from the transmission section 1 to the reception section 2, and output an information signal using the LCD display section 14 and/or the speaker 15.

Consequently, the transmission section 1 and the reception section 2 can be used at places spaced away from each other. Yet, when the information signal transmitted by radio from the transmission section 1 to the reception section 2 is subject to undue interference, the reception section 2 can be placed at the predetermined position at the upper portion of the transmission section 1 and the communication is changed over to non-wireless communication immediately. Thereby, eliminating or reducing the effect of the interference upon the communication.

Further, when an RF signal is used upon transmission by wire transmission as described above, only one line is required for transmission of a signal. Consequently, an information signal can be transmitted by wire transmission using a smaller number of lines than when compared with an alternative case wherein an AV signal is outputted. It is to be noted that a coaxial cable may be used as the transmission line for an RF signal.

It is to be noted that the radio communication apparatus according to the present invention is not limited to using a VCR 3 for producing an AV signal, but may alternatively use a tuner (not shown) for receiving image information and/or sound information transmitted from a transmitting station. Where a tuner is used, radio transmission and wire transmission, as well as the switching between them, may be performed in the same manner that they are performed in the VCR embodiment, and therefore, overlapping description of transmission and switching in the tuner embodiment is omitted to avoid redundancy.

Further, the AV signal generation apparatus of the transmission section 1 is not limited to a VCR or a tuner, but may be some other apparatus which has a function of outputting an AV signal. Also, the AV signal generation apparatus may be externally connected to the transmission section 1.

It is to be noted that the radio communication apparatus may be modified such that the antenna switches 5 and 10 are changed over manually. In this instance, a mechanism for such manual switching needs to be provided for the transmission section 1 and/or the reception section 2. The implementation of such a mechanism will be readily apparent to one skilled in the art after study of the description provided herein.

For non-wireless communication, an AV signal may be communicated in lieu of an RF signal. In such an implementation, the antenna switches 5 and 10 are not required, and the sensor 6 is connected to the radio AV transmitter 4 and sends connection information to the radio AV transmitter 4 while the sensor 9 is connected to the radio AV receiver 13 and sends connection information to the radio AV receiver 13. The AV signal is communicated directly between the radio AV transmitter 4 and the radio AV receiver 13 without converting it into an RF signal. In this instance, a greater number of connection terminals than that of the output terminal 8 and the input terminal 12 are prepared for each of the radio AV transmitter 4 and the radio AV receiver 13 and couplings for interconnecting the connection terminals are prepared to communicate the AV signal.

Although a greater number of communication terminals are required when an AV signal is used for non-wireless communication, the configuration can be simplified because the antenna switches 5 and 10 and so forth are not required.

While the present invention has been particularly shown and described in conjunction with preferred embodiments thereof, it will be readily appreciated by those of ordinary skill in the art that various changes may be made without departing from the spirit and scope of the invention.

Therefore, it is intended that the appended claims be interpreted as including the embodiments described herein as well as all equivalents thereto.

What is claimed is:

1. A radio communication apparatus, comprising:
   a transmission section for transmitting an information signal; and
   a reception section for receiving the information signal transmitted from said transmission section;
   said transmission section and said reception section being attachable to each other and being detachable from each other;
   wherein said transmission section further comprises:
   a transmitter for modulating the information signal to generate a high frequency signal;
   a transmission antenna for wirelessly transmitting the high frequency signal; and
   an output terminal for outputting the information signal to said reception section via a non-wireless coupling;
   said reception section further comprises:
   a reception antenna for receiving the high frequency signal transmitted from said transmission antenna;
   a receiver for demodulating the high frequency signal received by said reception antenna to generate an information signal; and an input terminal to which the information signal outputted from said output terminal of said transmission section is inputted;

at least one of said transmission section and said reception section further comprising:

a sensor for sensing an attached condition between said transmission section and said reception section, wherein the sensed condition is determined by a location of an applied voltage; and a switch for selectively switching, in accordance with the sensed condition of attachment between the transmission section and the reception section, between wireless transmission and non-wireless transmission when communicating said information signal from said transmission section to said reception section.

2. The radio communication apparatus according to claim 1, wherein said output terminal of said transmission section outputs the high frequency signal, and wherein said input terminal of said reception section receives the high frequency signal outputted from said output terminal of said transmission section.

3. The radio communication apparatus according to claim 1, wherein said transmission section further comprises:

a recorder/reproducer for recording and/or reproducing image information and/or sound information onto and/or from an information recording medium, and transmits the image information and/or sound information to said reception section as at least a portion of the information signal, and said reception section further comprises:

a reproducer for reproducing the image information and/or sound information included in the received information signal.

4. The radio communication apparatus according to claim 1, wherein said transmission section further comprises:

a receiver for receiving image information and/or sound information transmitted from a transmitting station and transmits the image information and/or sound information to said reception section as at least a portion of the information signal, and wherein said reception section further comprises:

a reproducer for reproducing the image information and/or sound information included in the received information signal.

5. A radio communication method, comprising the steps of:

sensing an attached condition between a transmission section and a reception section, said transmission section and said reception section being attachable to each other and being detachable from each other, wherein the sensed condition is determined by a location of an applied voltage; and switching, in accordance with the sensed condition of attachment between the transmission section and the reception section, between wireless transmission of an information signal from said transmission section to said reception section and non-wireless transmission of said information signal from said transmission section to said reception section;

wherein communicating said information signal from said transmission section to said reception section via wireless transmission:

modulating said information signal to generate a high frequency signal;

passing said high frequency signal to an antenna for transmission;

receiving said high frequency signal at said reception section; and demodulating said high frequency signal at said reception section to recover said information signal; and wherein communicating said information signal from said transmission section to said reception section via non-wireless transmission comprises:

outputting said information signal via a non-wireless terminal of said transmission section; and receiving said information signal via a non-wireless terminal of said reception section.

6. The radio communication method according to claim 5, wherein said non-wireless terminal of said transmission section outputs the high frequency signal, and said non-wireless terminal of said reception section receives the high frequency signal outputted from said non-wireless terminal of said transmission section.

7. A radio communication method according to claim 5, further comprising the steps of:

recording and/or reproducing, at said transmission section, image information and/or sound information onto and/or from an information recording medium;

including said image information and/or sound information in said information signal transmitted from said transmission section to said reception section; and reproducing, at said reception section, said image information and/or sound information included in said received information signal.

8. The radio communication method according to claim 5, further comprising the steps of:

receiving, at said transmission section, image information and/or sound information transmitted from a transmitting station;

including said image information and/or sound information in said information signal transmitted from said transmission section to said reception section; and reproducing, at said reception section, said image information and/or sound information included in said received information signal.

* * * * *